(12) United States Patent
Lee

(10) Patent No.: US 12,706,340 B2
(45) Date of Patent: Aug. 11, 2026

(54) BATTERY PACK

(71) Applicant: LG ENERGY SOLUTION, LTD., Seoul (KR)

(72) Inventor: Keun-Wook Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 776 days.

(21) Appl. No.: 17/781,319

(22) PCT Filed: Apr. 7, 2021

(86) PCT No.: PCT/KR2021/004373
§ 371 (c)(1),
(2) Date: May 31, 2022

(87) PCT Pub. No.: WO2021/235692
PCT Pub. Date: Nov. 25, 2021

(65) Prior Publication Data
US 2023/0006295 A1 Jan. 5, 2023

(30) Foreign Application Priority Data
May 22, 2020 (KR) ........................ 10-2020-0061858

(51) Int. Cl.
*H01M 50/204* (2021.01)
*B60L 50/60* (2019.01)
(Continued)

(52) U.S. Cl.
CPC ........... *H01M 50/204* (2021.01); *B60L 50/64* (2019.02); *B60L 50/66* (2019.02);
(Continued)

(58) Field of Classification Search
CPC .......... B60L 58/00; B60L 58/10; B60L 58/12; B60L 58/14; B60L 58/18; B60L 58/19;
(Continued)

(56) References Cited

U.S. PATENT DOCUMENTS 9,162,671 B2 10/2015 Itoh et al.
2011/0056811 A1* 3/2011 Takenaka ................ H01H 9/22
200/50.01
(Continued)

FOREIGN PATENT DOCUMENTS

EP 3 088 288 A2 11/2016
EP 3 648 235 A1 5/2020
(Continued)

OTHER PUBLICATIONS

JP 2014050138 A translation (Year: 2014).*
(Continued)

*Primary Examiner* — Allison Bourke
*Assistant Examiner* — Travis L. Martin
(74) *Attorney, Agent, or Firm* — Birch, Stewart, Kolasch & Birch, LLP

(57) ABSTRACT

A battery pack for efficiently supplying a power to a vehicle and including a battery assembly, a power supply terminal connectable to a connection terminal of the vehicle that is connected to a vehicle control unit and a vehicle motor, a power supply path located between the power supply terminal and the battery cell and supplying a power from the battery cell to the power supply terminal, a switching unit provided on the power supply path electrically turn on/off the power supply path, a mounting recognition unit recognizing whether the battery pack is mounted to the vehicle, and a processor controlling the switching unit so that a power is supplied from the battery cell to the vehicle control unit, when receiving a signal from the mounting recognition unit that the battery pack is recognized as being mounted to the vehicle.

11 Claims, 7 Drawing Sheets

(51) Int. Cl.

| | |
|---|---|
| ***B60L 50/64*** | (2019.01) |
| ***H01M 10/42*** | (2006.01) |
| ***H01M 50/249*** | (2021.01) |

(52) U.S. Cl.
CPC ..... *H01M 10/4257* (2013.01); *H01M 50/249* (2021.01); *H01M 2220/20* (2013.01)

(58) Field of Classification Search
CPC ........... B60L 58/22; H01M 50/20–298; H01M 50/262
See application file for complete search history.

(56) References Cited

U.S. PATENT DOCUMENTS

| | | | | |
|---|---|---|---|---|
| 2012/0298435 | A1 | 11/2012 | Jaffrezic | |
| 2013/0113279 | A1 | 5/2013 | Batanaka | |
| 2013/0127247 | A1* | 5/2013 | Oh | B60L 58/20 307/10.1 |
| 2013/0127400 | A1 | 5/2013 | Oh et al. | |
| 2015/0127206 | A1 | 5/2015 | Tsuji et al. | |
| 2015/0232150 | A1 | 8/2015 | Kosuge et al. | |
| 2015/0280467 | A1* | 10/2015 | Matsuda | B60L 58/14 307/10.1 |
| 2016/0303976 | A1 | 10/2016 | Cha et al. | |
| 2016/0336626 | A1* | 11/2016 | Kawauchi | H02J 7/0032 |
| 2023/0095740 | A1* | 3/2023 | Kuranuki | G01R 27/08 429/7 |

FOREIGN PATENT DOCUMENTS

| | | | | |
|---|---|---|---|---|
| JP | 10-69331 | A | | 3/1998 |
| JP | 11-59291 | A | | 3/1999 |
| JP | 2014-50138 | A | | 3/2014 |
| JP | WO2014/054069 | A1 | | 4/2014 |
| JP | 2017-91832 | A | | 5/2017 |
| JP | 6245947 | B2 | | 12/2017 |
| JP | 6603085 | B2 | | 11/2019 |
| JP | 2020-10598 | A | | 1/2020 |
| JP | 2020010598 | A | * | 1/2020 |
| KR | 10-2012-0101939 | A | | 9/2012 |
| KR | 10-2012-0120968 | A | | 11/2012 |
| KR | 10-2013-0019433 | A | | 2/2013 |
| KR | 10-2013-0069111 | A | | 6/2013 |
| KR | 10-1617292 | B1 | | 5/2016 |
| KR | 10-1684099 | B1 | | 12/2016 |
| KR | 10-2018-0057187 | A | | 5/2018 |
| KR | 10-2013991 | B1 | | 10/2019 |

OTHER PUBLICATIONS

JP 6603085 B2 translation (Year: 2019).*

JP2020010598A translation (Year: 2020).*

International Search Report for PCT/KR2021/004373 (PCT/ISA/210) mailed on Jul. 19, 2021.

Extended European Search Report for European Application No. 21809256.7, dated May 15, 2023.

* cited by examiner

BATTERY PACK

TECHNICAL FIELD

The present application claims priority to Korean Patent Application No. 10-2020-0061858 filed on May 22, 2020 in the Republic of Korea, the disclosures of which are incorporated herein by reference.

The present disclosure relates to a battery technology, and more specifically, to a technology that allows smooth communication connection and power supply with a vehicle when a battery is mounted to the vehicle.

BACKGROUND ART

Currently commercialized secondary batteries include nickel cadmium battery, nickel hydrogen battery, nickel zinc battery, lithium secondary battery, and so on. Among these, the lithium secondary battery has almost no memory effect to ensure free charge and discharge, compared to the nickel-based secondary battery, and the lithium secondary battery is spotlighted due to a very low discharge rate and a high energy density.

The lithium secondary battery mainly uses a lithium-based oxides and a carbon material as a positive electrode active material and a negative electrode active material, respectively. The lithium secondary battery includes an electrode assembly in which a positive electrode plate and a negative electrode plate respectively coated with the positive electrode active material and the negative electrode active material are disposed with a separator being interposed therebetween, and an exterior, or a battery case, for hermetically accommodating the electrode assembly together with an electrolyte.

Generally, the lithium secondary batteries may be classified into a can-type secondary battery having an electrode assembly included in a metal can and a pouch-type secondary battery having an electrode assembly included in a pouch of an aluminum laminate sheet, depending on the shape of the exterior.

The secondary batteries have been widely used to supply an operation power to portable terminals such as smart phones and laptop computers for several decades, and recently, as the development and distribution of electric vehicles expand, the secondary batteries are recognized as a very important part serving as a driving energy source that enables electric vehicles to move. In particular, since high output and capacity are required to drive an electric vehicle, the secondary battery is not used alone, but a large number of secondary batteries are connected in series and/or parallel to each other to constitute one high-voltage battery pack, and the battery pack is mounted to the electric vehicle.

The battery pack for supplying a driving power for moving the vehicle as described above may be configured to be attachable to and detachable from a vehicle. Further, as the shared e-mobility business is activated, the secondary battery may be configured to be easily mounted to and detached from a vehicle by not only professional technicians but also general drivers. For example, in order to use a shared vehicle, a user may carry a battery pack and directly mount it after reaching the shared vehicle.

In such a situation, if the battery pack is mounted to the vehicle, it is necessary to properly supply a power between the vehicle and the battery pack. In particular, the vehicle is equipped with a control unit such as a VCU (Vehicle Control Unit), and when the battery pack is mounted, it is necessary to perform smooth communication between the control unit of the vehicle and the battery pack. In general, when a driver starts the vehicle, a power supply request signal may be transmitted from the vehicle control unit (VCU) to the battery pack, so that a driving power is supplied from the battery pack to a motor.

However, if communication between the control unit of the vehicle and the battery pack is not smoothly performed, a situation may occur in which the power supply request signal is not transmitted from the control unit of the vehicle to the battery pack even if the driver sends a request for starting. In addition, due to this, the vehicle may not start properly.

Moreover, the electric vehicle may be separately equipped with an auxiliary battery for supplying a power to electrical components of the vehicle, such as an instrument panel, a radio, a navigation system and an air conditioner, in addition to the battery pack for supplying a driving power. At this time, the control unit of the vehicle such as the VCU may also be operated by receiving a power from the auxiliary battery. However, if the auxiliary battery is fully discharged, an operation power is not supplied to the control unit of the vehicle, so the control unit of the vehicle cannot transmit a start request signal or the like to the battery pack. Therefore, even if the battery pack is fully charged, the vehicle may not be started since auxiliary battery of the vehicle is fully discharged.

Moreover, in the case of a shared vehicle, since the vehicle is not directly managed by a user, it is impossible to properly figure out in advance whether the auxiliary battery of the vehicle is in a fully discharged state. In addition, since the vehicle is not always located at a service provider due to the characteristics of the shared vehicle, it is difficult to manage whether the auxiliary battery provided in each vehicle is fully discharged one by one.

DISCLOSURE

Technical Problem

The present disclosure is designed to solve the problems of the related art, and therefore the present disclosure is directed to providing a battery pack for a vehicle, which is configured to efficiently supply a power to the vehicle when the battery pack is mounted to an electric vehicle, and a vehicle including the battery pack.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof

Technical Solution

In one aspect of the present disclosure, there is provided a battery pack, which is configured to be mountable to and detachable from a vehicle driven by a motor and having a vehicle control unit to supply a driving power to the motor, the battery pack comprising: a battery assembly having at least one secondary battery; a power supply terminal configured to be connectable to a connection terminal of the vehicle that is connected to the vehicle control unit and the motor; a power supply path located between the power supply terminal and the battery assembly and configured to supply a power from the battery assembly to the power supply terminal; a switching unit provided on the power supply path and configured to electrically turn on/off the power supply path; a mounting recognition unit configured to recognize whether the battery pack is mounted to the vehicle; and a processor configured to control the switching unit so that a power is supplied from the battery assembly to the vehicle control unit, when receiving a signal from the mounting recognition unit that the battery pack is recognized as being mounted to the vehicle.

Here, the processor may be configured to be communicable with the vehicle control unit and transmit a response signal to the vehicle control unit when receiving a start request signal of a user from the vehicle control unit.

In addition, the power supply terminal may include a control power terminal configured to be connectable to a connection terminal of the vehicle control unit and a driving power terminal configured to be connectable to a connection terminal of the motor, and the power supply path may include a control power path connected between the battery assembly and the control power terminal and configured to supply an operation power to the vehicle control unit and a driving power path connected between the battery assembly and the driving power terminal and configured to supply the driving power to the motor.

In addition, the switching unit may include a control switching unit provided on the control power path and configured to turn on and off supply of the operation power and a driving switching unit provided on the driving power path and configured to turn on and off supply of the driving power.

In addition, the processor may be configured to turn on the control switching unit so that the operation power is supplied from the battery assembly to the vehicle control unit, when the mounting recognition unit recognizes that the battery pack is mounted.

In addition, the processor may be configured to turn on the driving switching unit so that the driving power is supplied from the battery assembly to the motor, when receiving a start request signal of a user from the vehicle control unit.

In addition, when the vehicle includes an auxiliary battery for supplying a power to the vehicle control unit, the processor may be configured to control the switching unit so that a power is supplied from the battery assembly to the auxiliary battery, thereby supplying a power to the vehicle control unit indirectly.

In addition, the mounting recognition unit may be configured to be physically deformed when the battery pack is placed at a designated position of the vehicle to recognize whether the battery pack is mounted.

In addition, the mounting recognition unit may include a global positioning system (GPS) module to recognize whether the battery pack is mounted.

In another aspect of the present disclosure, there is also provided a vehicle, comprising the battery pack according to the present disclosure.

ADVANTAGEOUS EFFECTS

According to an embodiment of the present disclosure, with respect to the battery pack configured to be attachable to and detachable from a vehicle, it is possible to determine whether the battery pack is mounted to the vehicle by itself Therefore, even if a separate signal is not received from the control unit of the vehicle, a power may be smoothly supplied from the battery pack to the vehicle, particularly to the control unit of the vehicle. Therefore, according to this embodiment of the present disclosure, the battery pack may be configured to perform smooth communication between the battery pack and the vehicle control unit, when the battery pack is mounted to a vehicle.

Moreover, if an auxiliary battery for supplying a power to the vehicle control unit is provided to the vehicle, even if the auxiliary battery is in a fully discharged state, an operating power may be automatically supplied to the vehicle control unit or the auxiliary battery by mounting the battery pack. In addition, due to this, communication between the vehicle control unit and the battery pack may be made normally. Therefore, even if the auxiliary battery of the vehicle is fully discharged, the user may start and drive the vehicle normally.

Therefore, according to this embodiment of the present disclosure, it is possible to prevent a problem that the vehicle cannot be started due to full discharge of the auxiliary battery to cause unexpected damage to a driver.

Moreover, this embodiment of the present disclosure may be more effectively applied to a shared e-mobility business and the like. That is, even though a driver using a shared vehicle service or a service provider providing such a service does not check whether the auxiliary battery is fully discharged, just by mounting the battery pack to the vehicle, it is possible to charge the auxiliary battery or supply an operation power to the vehicle control unit, so the vehicle can be started normally. Accordingly, a driver using the shared vehicle service may use the corresponding service smoothly, and it is possible to reduce the management and maintenance cost of a service provider providing the service.

In addition, effects of various embodiments according to the present disclosure may be achieved, and some other effects will be described later in each embodiment.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
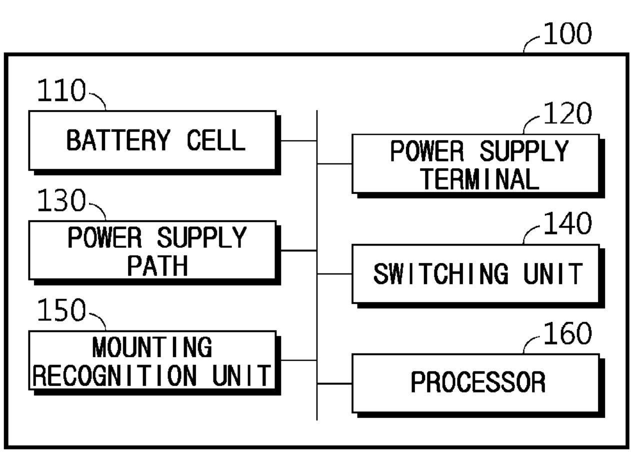
FIG. 1 is a block diagram schematically showing a functional configuration of a battery pack according to an embodiment of the present disclosure.
Figure 2:
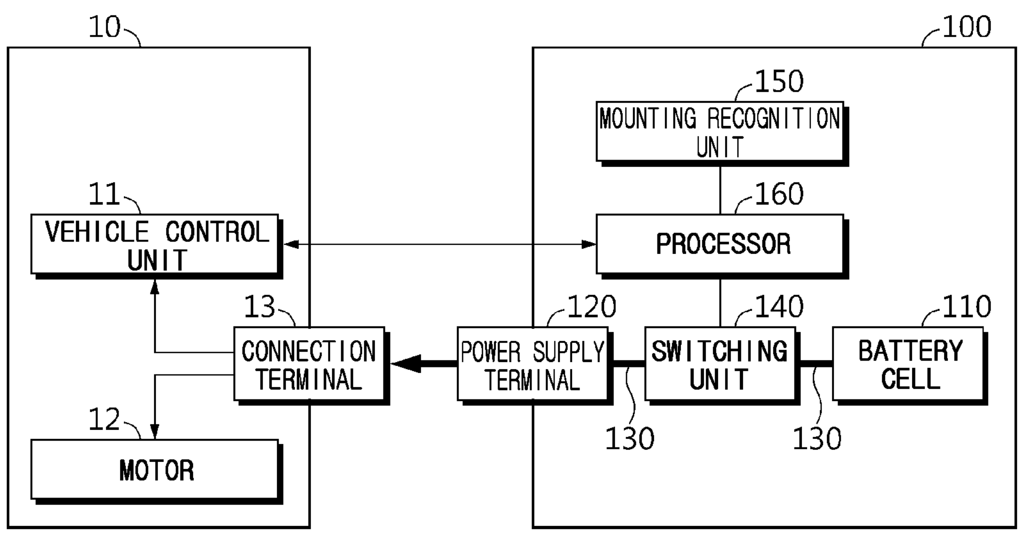
FIG. 2 is a diagram schematically showing a connection configuration between a battery pack and a vehicle according to an embodiment of the present disclosure.

FIG. 1 is a block diagram schematically showing a functional configuration of a battery pack 100 according to an embodiment of the present disclosure, and FIG. 2 is a diagram schematically showing a connection configuration between a battery pack 100 and a vehicle 10 according to an embodiment of the present disclosure.

The battery pack 100 according to the present disclosure may be configured to be attachable to and detachable from the vehicle 10. That is, the battery pack 100 according to the present disclosure may be mounted to the vehicle 10 or may be separated from the vehicle 10. Further, the battery pack 100 according to the present disclosure may be configured in the form of an interchangeable battery pack 100 that may be freely mounted to or detached from the same type of vehicle 10 or different types of vehicles 10. To this end, the battery pack 100 according to the present disclosure may be configured to be mechanically coupled to a portion of the vehicle 10 in order to maintain the electrically coupled state as well as to be electrically coupled to the vehicle 10. However, the present disclosure is not specifically limited in regard to the mechanical and/or electrical coupling configuration of the battery pack 100 and the vehicle 10, and various electrical and/or mechanical coupling configurations known at the time of filing of this application may be employed in the present disclosure.

Meanwhile, the vehicle 10 to which the battery pack 100 according to the present disclosure is mounted may be a vehicle 10 that includes a motor 12 and is driven by the motor 12, namely an electric vehicle moving by the motor 12. Here, the electric vehicle may include not only a pure electric vehicle but also a hybrid electric vehicle having an engine together with the motor 12, a two-wheeled vehicle, and the like.

In addition, the vehicle 10 to which the battery pack 100 according to the present disclosure is mounted may include a vehicle control unit 11. Here, the vehicle control unit 11 may be expressed in terms such as VCU, and may mean a control device provided in the vehicle 10 to control the driving or the like of the vehicle 10. Since the vehicle control unit 11 is a technology already known at the time of filing of this application, it will not described in detail here.

The battery pack 100 according to the present disclosure may be configured to supply a power to the vehicle 10. In particular, the battery pack 100 according to the present disclosure may supply a power to the motor 12 and the vehicle control unit 11 of the vehicle 10.

Referring to FIGS. 1 and 2, the battery pack 100 according to the present disclosure may include a battery cell 110 (i.e., battery assembly), a power supply terminal 120, a power supply path 130, a switching unit 140, a mounting recognition unit 150, and a processor 160.

The battery cell 110 may include at least one secondary battery. In addition, the secondary battery may include an electrode assembly, an electrolyte and an exterior. Here, the electrode assembly is an assembly of an electrode and a separator and may be configured in a form where at least one positive electrode plate and at least one negative electrode are disposed with a separator being interposed therebetween. In addition, each electrode plate of the electrode assembly may have an electrode tab to be connected to an electrode lead. The secondary battery may include a pouch-type secondary battery in which an exterior is configured in the form of an aluminum pouch sheet and/or a can-type secondary battery in which an exterior is configured in the form of a metal can. Further, since the battery pack 100 according to the present disclosure is mounted to the vehicle 10 and requires high output and/or high capacity to supply a driving power to the vehicle 10, the battery pack 100 may include a battery cell 110 in which a plurality of secondary batteries are connected in series and/or parallel. In addition, the battery cell 110 may store and discharge energy for driving through repeated charging and discharging. The present disclosure is not limited by a specific shape or configuration of the battery cell 110, particularly the secondary battery, and various types of secondary batteries or battery cells 110 known at the time of filing of this application may be employed in the present disclosure.

The power supply terminal 120 may be configured to be connectable to a connection terminal 13 provided to the vehicle 10. Here, the connection terminal 13 of the vehicle 10 is a terminal provided on at least one side of the vehicle 10 to be connected to the battery pack 100, and may be configured in the form of an outlet or a plug. In particular, the connection terminal 13 of the vehicle 10 may be configured to be electrically connected to the vehicle control unit 11 and the motor 12. For example, in the vehicle 10, the connection terminal 13 may be configured to be connected to the vehicle control unit 11 and the motor 12, respectively. Accordingly, the power supplied to the connection terminal 13 of the vehicle 10 may be supplied to the vehicle control unit 11 and the motor 12. The power supply terminal 120 is a terminal of the battery pack 100 configured to be connectable to the connection terminal 13 of the vehicle 10, and may be configured in a form corresponding to the connection terminal 13 of the vehicle 10, for example in the form of an outlet or a plug.

The power supply path 130 may be disposed to be located between the power supply terminal 120 and the battery cell 110. In addition, the power supply path 130 may be configured to supply a power from the battery cell 110 to the power supply terminal 120. That is, the power supply path 130 may provide a path through which a power is supplied from the battery cell 110 to the power supply terminal 120. The power supply path 130 may employ various power supply types known at the time of filing of this application, such as a wire or a metal plate including an electrically conductive material, a printed conductor pattern, and the like.

The switching unit 140 may be provided on the power supply path 130. In addition, the switching unit 140 may be configured to be opened and closed to electrically turn on/off the power supply path 130. For example, if the switching unit 140 is turned on, the power supply path 130 may be connected so that a power may be supplied from the battery cell 110 to the power supply terminal 120. Meanwhile, if the switching unit 140 is turned off, the power supply path 130 may be disconnected so that a power may not be supplied from the battery cell 110 to the power supply terminal 120. As the switching unit 140, various types of switching devices known at the time of filing of this application may be employed. For example, the switching unit 140 may be implemented with a metal oxide semiconductor field effect transistor (MOSFET) or the like.

The mounting recognition unit 150 may be configured to recognize whether the battery pack 100 is mounted to the vehicle 10. That is, the mounting recognition unit 150 may be configured to recognize whether the battery pack 100 is properly mounted to the vehicle 10. In particular, the vehicle 10 may be equipped with a mounting portion serving as a position for the battery pack 100 to be mounted, and the mounting recognition unit 150 may recognize that battery pack 100 is mounted to vehicle 10 when the battery pack 100 is correctly placed on the mounting portion. In addition, if it is recognized that the battery pack 100 is properly mounted to the vehicle 10, the mounting recognition unit 150 may be configured to transmit the corresponding information to other components, in particular, the processor 160.

The processor 160 may be configured to be connected to the mounting recognition unit 150 in a wired and/or wireless communication manner to receive a signal from the mounting recognition unit 150 indicating that the battery pack 100 is recognized as being mounted to the vehicle 10. In addition, when receiving such a signal, namely the information that the battery pack 100 is properly mounted at a predetermined position of the vehicle 10, the processor 160 may be configured to control the switching unit 140 so that a power is supplied from the battery cell 110 to the vehicle control unit 11. That is, if the mounting recognition unit 150 recognizes that the battery pack 100 is mounted, the processor 160 may convert the switching unit 140 from a turn-off state to a turn-on state so that a power is supplied to the power supply path 130.

According to this configuration of the present disclosure, the battery pack 100 may recognize by itself that the battery pack 100 is mounted to the vehicle 10, so that a power is supplied to the vehicle control unit 11 of the vehicle 10. Accordingly, a power may be supplied to the vehicle control unit 11 even though a separate signal is not received from another device outside the battery pack 100, such as the vehicle control unit 11.

In particular, according to this configuration of the present disclosure, there is no need to separately provide the vehicle 10 with an auxiliary battery for supplying an operating power to the vehicle control unit 11. In addition, according to the embodiment, if an auxiliary battery is provided in the vehicle 10 and the vehicle control unit 11 is configured to operate by a power from the auxiliary battery, even if the auxiliary battery is fully discharged, an operating power is supplied to the vehicle control unit 11, so that the vehicle control unit 11 may normally operate. Therefore, if a driver starts the vehicle 10 in a state where the battery pack 100 is mounted to the vehicle 10, even if the auxiliary battery is fully discharged, the vehicle control unit 11 operates normally by the power supplied from the battery pack 100, thereby allowing the vehicle 10 to run.

The processor 160 is well known in the art for executing various control logics performed in the present disclosure, and may optionally include or be expressed in terms of a central processing unit (CPU), an application-specific integrated circuit (ASIC), a chipset, a logic circuit, a register, a communication modem, a data processing device and the like. Also, when the control logic is implemented in software, the processor 160 may be implemented as a set of program modules. In this case, the program module may be stored in a memory and executed by the processor 160. The memory may be provided inside or outside the processor 160, and may be connected to the processor 160 by various well-known means. Moreover, the battery pack 100 often includes a control device referred to by terms such as MCU (Micro Controller Unit) or BMS (Battery Management System). The processor 160 may be implemented by components such as MCU or BMS generally included in the battery pack 100.

In addition, the processor 160 may be configured to communicate with the vehicle control unit 11. For example, the processor 160 may be connected with the vehicle control unit 11 through wired communication and/or wireless communication to transmit/receive signals to and from the vehicle control unit 11. In addition, for communication with the vehicle control unit 11, the processor 160 may include a connector or cable for wired communication and/or an antenna for wireless communication. In addition, as a communication method between the processor 160 and the vehicle control unit 11, various communication technologies known at the time of filing of this application may be employed as a matter of course.

Meanwhile, through a communication connection between the processor 160 and the vehicle control unit 11, a power may be supplied to the motor 12 according to a start request signal of the user, which will be described in more detail with reference to FIG. 3.

Figure 3:
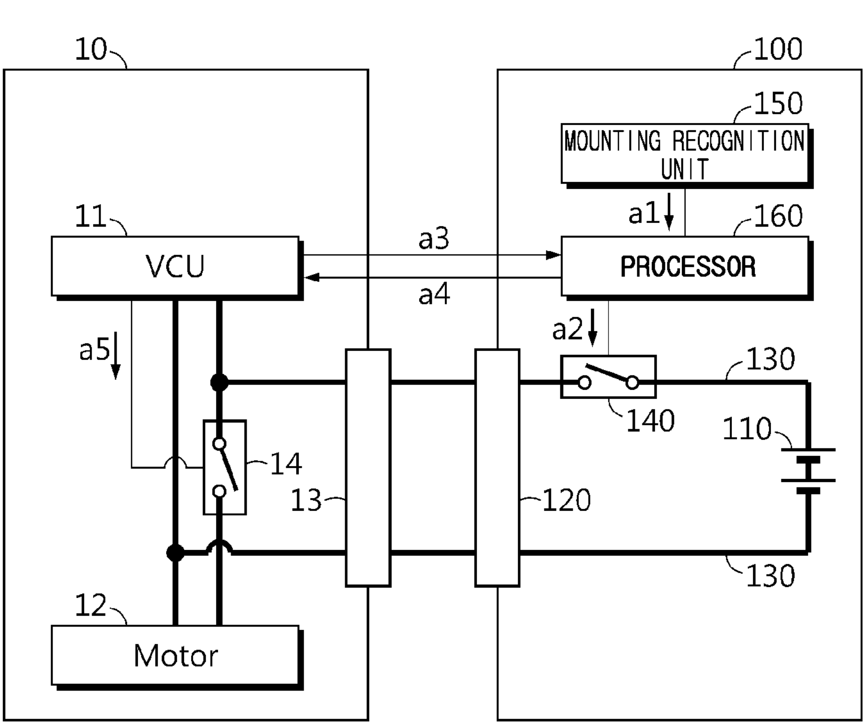
FIG. 3 is a diagram schematically showing a circuitry connection configuration between the battery pack and the vehicle according to an embodiment of the present disclosure.

FIG. 3 is a diagram schematically showing a circuitry connection configuration between the battery pack 100 and the vehicle 10 according to an embodiment of the present disclosure. In this embodiment, features different from the former embodiment will be described in detail, and features identical or similar to those of the former embodiment will not be described in detail.

Referring to FIG. 3, the vehicle control unit (VCU) 11 and the motor 12 may be configured to be supplied with power from an external device, for example the battery pack 100, through a common connection terminal 13. In addition, a motor switch 14 for opening and closing the power supply path 130 connected to the motor 12 may be provided on a path where a power is supplied from the common connection terminal 13 to the motor 12.

In addition, corresponding to the configuration of the vehicle 10, the battery pack 100 may be configured such that power is supplied to the vehicle control unit 11 and the motor 12 through a common power supply terminal 120 and a common power supply path 130, respectively. That is, in the embodiment of FIG. 3, the battery pack 100 may supply power to the vehicle control unit 11 or the motor 12 through the common power supply path 130 and the common power supply terminal 120.

In this configuration, if it is recognized that the battery pack 100 is mounted to the vehicle 10, the mounting recognition unit 150 may transmit mounting recognition information of the battery pack 100 to the processor 160 as indicated by an arrow a1.

Then, the processor 160 may transmit a turn-on signal to the switching unit 140 as indicated by an arrow a2. Then, the power supply path 130 of the battery pack 100 may be connected so that a power is supplied from the battery cell 110 to the vehicle control unit 11 through the power supply terminal 120 and the connection terminal 13 of the vehicle 10. At this time, the motor switch 14 of the vehicle 10 may be maintained in a turn-off state. Then, the vehicle control unit 11 supplied with the power is in an operable state.

In addition, if the user starts the vehicle 10, the vehicle control unit 11 recognizes this and, as indicated by an arrow a3, may transmit a start request signal indicating that the user starts the vehicle to the processor 160. In this case, the processor 160 may transmit a response signal indicating that the start request signal is successfully received to the vehicle control unit 11, as indicated by an arrow a4. Then, the vehicle control unit 11 may transmit a control signal for converting the motor switch 14 provided on the power path between the connection terminal 13 and the motor 12 in the vehicle 10 from a turn-off state to a turn-on state, as indicated by an arrow a5. In addition, by turning on the motor switch 14 as described above, a power may be supplied from the battery pack 100 to the motor 12 so that the vehicle 10 may operate.

According to this embodiment of the present disclosure, if the battery pack 100 is mounted to the vehicle 10, a power may be directly supplied from the battery pack 100 to the vehicle control unit 11. Accordingly, in this case, an auxiliary battery for supplying a power to the vehicle control unit 11 may not be separately provided in the vehicle 10. Therefore, it is possible to prevent the problem that vehicle 10 does not start due to full discharge of the auxiliary battery.

In addition, according to the embodiment of the present disclosure, terminals or paths for supplying a power to the vehicle control unit 11 and the motor 12 may not be provided in a separated form in the battery pack 100 but may be provided in a common form. Accordingly, in this case, the configuration of the battery pack 100 may be simplified, and manufacturing cost or manufacturing time may be reduced, thereby improving productivity of the battery pack 100 and facilitating maintenance and repair of the battery pack 100.

Moreover, according to this embodiment, a current may flow in the power supply path 130 only when the battery pack 100 is mounted to the vehicle 10. Accordingly, in a state where the battery pack 100 is not mounted to the vehicle 10, the risk of electric shock to a driver or user may be reduced. Further, a user who uses a shared e-mobility service or the like may often carry the battery pack 100 directly so as to mount the battery pack 100 to the vehicle 10, and in this process, it is possible to prevent the problem that the user is electrically shorted by contacting the power supply terminal 120 or the like of the battery pack 100.

Meanwhile, in the above embodiment, the processor 160 may be configured to receive an operation signal indicating stable operation from the vehicle control unit 11 within a predetermined time after turning on the switching unit 140. In addition, the processor 160 may be configured to determine whether the battery pack 100 is stably mounted and connected to the vehicle 10 according to whether the operation signal is received. If the processor 160 turns on the switching unit 140 and does not receive an operation signal from the vehicle control unit 11 even after a predetermined time elapses, the processor 160 may turn off the switching unit 140. Also, in this case, the processor 160 may transmit a signal to the mounting recognition unit 150 to check whether the mounting is recognized again. Then, when the mounting recognition signal is received by the mounting recognition unit 150 again, the processor 160 may turn on the switching unit 140 again so that the vehicle control unit 11 may operate.

According to this configuration of the present disclosure, it is possible to prevent the power supply path 130 of the battery pack 100 from being continuously maintained in a turn-on state even though the battery pack 100 is not mounted to the vehicle 10 due to an error of the mounting recognition unit 150 or the like. Accordingly, the safety of the battery pack 100 may be further improved.

Also, the processor 160 may be configured to check whether the battery pack 100 is being charged. For example, the processor 160 may be configured to figure out whether a charger is connected to the battery pack 100 or disconnected from the battery pack 100. In addition, the processor 160 may be configured to enable the operation of the mounting recognition unit 150 only when the battery pack 100 is disconnected from the charger. Alternatively, the processor 160 may be configured to turn on the switching unit 140 only when the battery pack 100 is disconnected from the charger.

According to this configuration of the present disclosure, it is possible to prevent the mounting recognition unit 150 from operating unnecessary, thereby reducing resource consumption by the mounting recognition unit 150. In addition, according to this embodiment, in a state where the battery pack 100 keeps connected to the charger, the switching unit 140 is maintained in a turn-off state so that the charging operation of the battery cell 110 is stably performed, and also the safety of the battery cell 110 may be improved.

Figure 4:
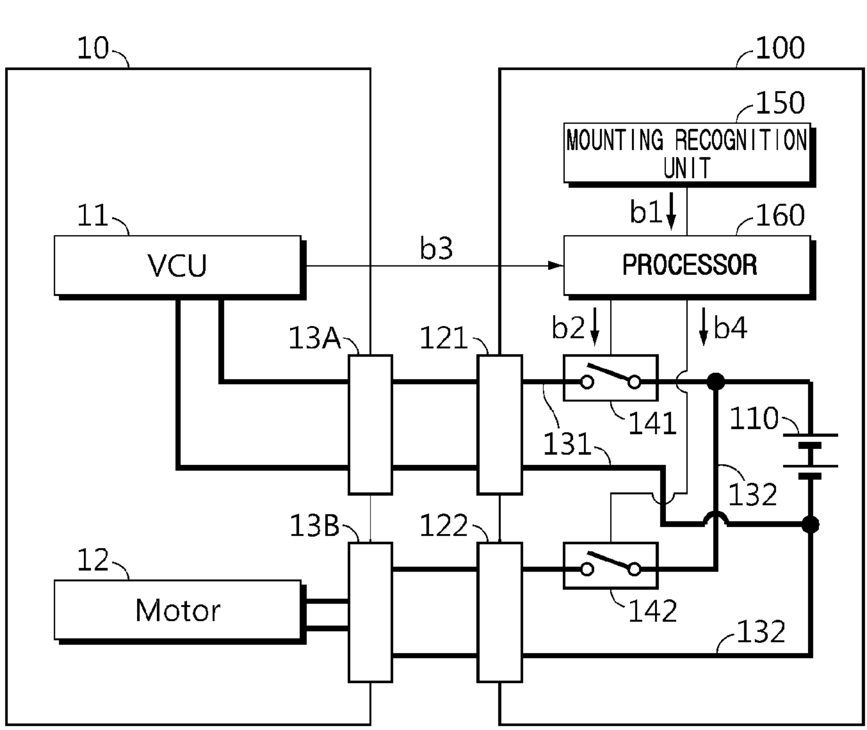
FIG. 4 is a diagram schematically showing a circuitry connection configuration between the battery pack and the vehicle according to another embodiment of the present disclosure.

FIG. 4 is a diagram schematically showing a circuitry connection configuration between the battery pack 100 and the vehicle 10 according to another embodiment of the present disclosure. In this embodiment, features different from the former embodiment will also be described in detail.

Referring to FIG. 4, in the vehicle 10, the vehicle control unit (VCU) 11 and the motor 12 may be configured to have different connection terminals 13A, 13B. In addition, the connection terminals 13A, 13B of the vehicle control unit 11 and the motor 12 may be configured to supply power to the vehicle control unit 11 and the motor 12 through different supply paths, respectively.

Corresponding to this configuration of the vehicle 10, the battery pack 100 may be configured such that components corresponding to the vehicle control unit 11 and components corresponding to the motor 12 are separately provided for the power supply terminal 120 and the power supply path 130, respectively.

In particular, the power supply terminal 120 may include a control power terminal 121 and a driving power terminal 122. Here, the control power terminal 121 may be configured to be connectable to the connection terminal 13A of the vehicle control unit 11. In addition, the driving power terminal 122 may be configured to be connectable to the connection terminal 13B of the motor 12. For example, the control power terminal 121 and the driving power terminal 122 may have shapes and specifications corresponding to the connection terminal 13A of the vehicle control unit 11 and the connection terminal 13B of the motor 12, respectively.

Also, the power supply path 130 may include a control power path 131 and a driving power path 132. Here, the control power path 131 may be a path connected between the battery cell 110 and the control power terminal 121 and configured to supply an operation power to the vehicle control unit 11. Accordingly, the vehicle control unit 11 may receive the operation power from the battery cell 110 via the control power path 131, the control power terminal 121 and the connection terminal 13A. In addition, the driving power path 132 may be a path connected between the battery cell 110 and the driving power terminal 122 and configured to supply a driving power to the motor 12. Accordingly, the motor 12 may receive the driving power from the battery cell 110 via the driving power path 132, the driving power terminal 122 and the connection terminal 13B.

In this configuration, the switching unit 140 may include a control switching unit 141 and a driving switching unit 142. Here, the control switching unit 141 may be provided on the control power path 131 to switch whether or not to supply an operation power. For example, if the control switching unit 141 is turned on, the control power path 131 may be maintained in a connected state, so that an operation power may be supplied from the battery cell 110 to the vehicle control unit 11. In addition, the driving switching unit 142 may be provided on the driving power path 132 and configured to switch whether or not to supply a driving power. For example, if the driving switching unit 142 is turned on, the driving power path 132 may be maintained in a connected state, so that a driving power may be supplied from the battery cell 110 to the motor 12. In this case, the control switching unit 141 and the driving switching unit 142 may be turned on or off under the control of the processor 160.

In particular, if the mounting recognition unit 150 recognizes that the battery pack 100 is mounted, the processor 160 may be configured to turn on the control switching unit 141 so that an operation power is supplied from the battery cell 110 to the vehicle control unit 11. More specifically, if the battery pack 100 is mounted to the vehicle 10, as indicated by an arrow b1, a signal indicating that the battery pack 100 is recognized as being mounted may be transmitted from the mounting recognition unit 150 to the processor 160. Then, the processor 160 may transmit a control signal for converting the turn-off state to the turn-on state to the control switching unit 141 as indicated by an arrow b2. In addition, if the control switching unit 141 is turned on, an operation power may be supplied from the battery cell 110 to the vehicle control unit 11 via the control power path 131, the control power terminal 121 and the vehicle control unit connection terminal 13A. Then, the vehicle control unit 11 may be in an operable state.

Here, if receiving the start request signal of the user from the vehicle control unit 11, the processor 160 may be configured to turn on the driving switching unit 142 so that a driving power is supplied from the battery cell 110 to the motor 12.

More specifically, if the driver starts the vehicle, as indicated by an arrow b3, the start request signal may be transmitted from the vehicle control unit 11 to the processor 160. In addition, the processor 160 receiving the start request signal may transmit a control signal for converting the driving switching unit 142 from the turn-off state to the turn-on state as indicated by an arrow b4. In addition, if the driving switching unit 142 is turned on, a driving power may be supplied from the battery cell 110 to the motor 12 via the driving power path 132, the driving power terminal 122 and the motor connection terminal 13B. Then, the motor 12 is driven, so that the vehicle 10 may be operated.

According to this configuration of the present disclosure, a separate switch may not be provided between the vehicle control unit 11 and/or the motor 12 of the vehicle 10 and the connection terminals 13A, 13B. That is, according to this embodiment, a power may be selectively supplied to the vehicle control unit 11 and/or the motor 12 through the switch control of the battery pack 100 itself, without separately controlling the switch by the vehicle control unit 11 of the vehicle 10. Accordingly, since the battery pack 100 determines whether or not to supply an operation power or a driving power regardless of whether a switch is provided on the power path of the vehicle 10, compatibility of the battery pack 100 may be further improved.

In addition, according to this embodiment, it is not necessary to separately provide the vehicle 10 with an auxiliary battery for supplying an operation power to the vehicle control unit 11, similar to the embodiment of FIG. 3. Accordingly, it is possible to prevent a problem such as inability to start the vehicle 10 due to full discharge of the auxiliary battery.

Moreover, according to this embodiment, since it is not necessary to control the switch by the vehicle control unit 11 in the process of supplying a driving power to the motor 12, it is possible to reduce the load of the vehicle control unit 11 and the number of components.

Meanwhile, the mounting recognition unit 150 may be configured to turn off the switching unit 140 if the battery pack 100 deviates from a predetermined mounting position of the vehicle 10. For example, if the battery pack 100 is separated from the vehicle 10, the mounting recognition unit 150 may be configured to recognize that the battery pack 100 is separated, and may transmit information indicating that the battery pack 100 is separated to the processor 160. Then, upon receiving the information indicating that the battery pack 100 is separated, the processor 160 may be configured to turn off the switching units 140 of FIG. 3 or the control switching unit 141 and/or the driving switching unit 142 of FIG. 4.

According to this configuration of the present disclosure, in a situation where there is a high possibility that a user such as a driver may come into contact with the power supply terminal 120 since the battery pack 100 is separated, an electric current does not flow to the power supply path 130, thereby eliminating the risk of electric shock to the user to improve the safety of the battery pack 100.

Further, in the embodiment of FIG. 4, if the mounting recognition unit 150 detects that the battery pack 100 deviates, namely is separated, from the vehicle 10, the processor 160 may be configured to turn off the driving switching unit 142 immediately but not to turn off the control switching unit 141 immediately.

A relatively high voltage may be supplied to the driving power terminal 122, compared to the control power terminal 121. Here, if it is detected that the battery pack 100 is separated, the risk of electric shock in regard to the corresponding terminal may be removed by closing the power path of the driving power terminal 122. Meanwhile, a power is supplied by the control power path 131 for a predetermined time or until a corresponding signal is received from the vehicle control unit 11, so that even when a power is not supplied from the battery pack 100 to the motor 12, the vehicle control unit 11 may operate for a predetermined time. Accordingly, even when the motor 12 is not driven, communication may be established between the vehicle control unit 11 and the processor 160 for at least a predetermined time.

Meanwhile, in the embodiment of FIG. 4, the configuration in which the processor 160 transmits a turn-on signal to the driving switching unit 142 may be performed under the control of the vehicle control unit 11. For example, upon recognizing that the user starts the vehicle, the vehicle control unit 11 may attempt to communicate with the processor 160 (the arrow b3), and the processor 160 may transmit a signal in response thereto to the vehicle control unit 11. Then, the vehicle control unit 11 may request the processor 160 to turn on the driving switching unit 142. In addition, the processor 160 receiving the request from the vehicle control unit 11 may turn on the driving switching unit 142 (the arrow b4) so that a driving power is supplied to the motor 12.

Figure 5:
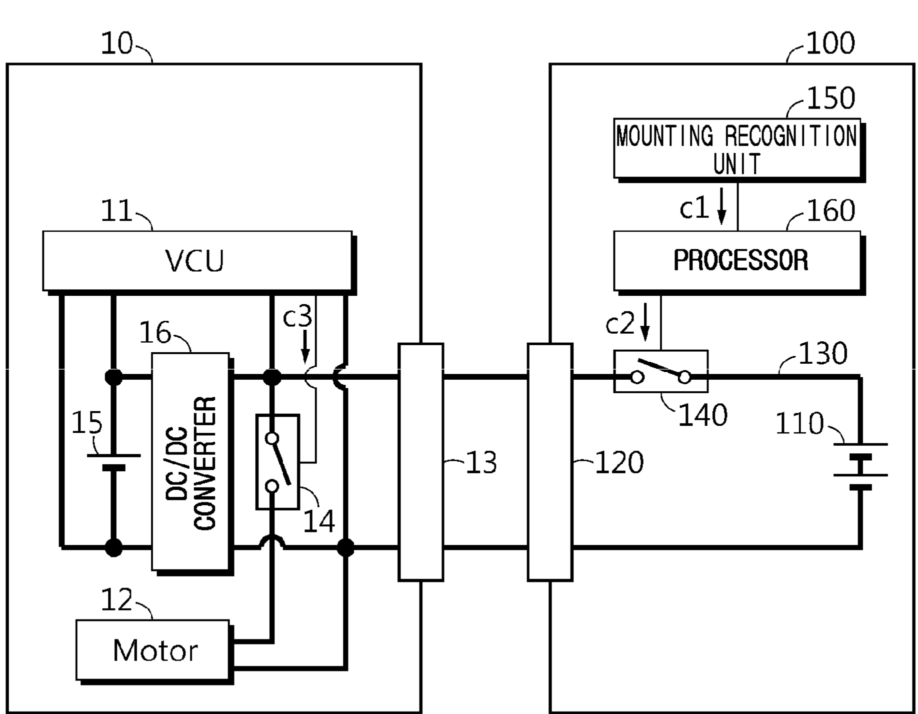
FIG. 5 is a diagram schematically showing a circuitry connection configuration between the battery pack and the vehicle according to still another embodiment of the present disclosure.

FIG. 5 is a diagram schematically showing a circuitry connection configuration between the battery pack 100 and the vehicle 10 according to still another embodiment of the present disclosure. In this embodiment, features different from the former embodiment will also be described in detail.

Referring to FIG. 5, this embodiment is generally similar to the embodiment of FIG. 3, except that an auxiliary battery 15 for supplying a power to the vehicle control unit 11 is provided in the vehicle 10. Here, the auxiliary battery 15 is provided in a form capable of supplying a power to the vehicle control unit 11, and may be located between the common connection terminal 13 and the vehicle control unit 11. That is, the auxiliary battery 15 may be configured to be chargeable by a power supplied to the connection terminal 13. In addition, the auxiliary battery 15 may be configured to be capable of discharging to the vehicle control unit 11, and may supply an operation power to the vehicle control unit 11. In addition, as shown in FIG. 5, a DC/DC converter 16 may be provided between the connection terminal 13 and the auxiliary battery 15 to convert the magnitude of the power supplied to the connection terminal 13 to a level at which the auxiliary battery 15 can be charged.

In the case of the battery pack 100 configured to be attachable to and detachable from the vehicle 10 having the above configuration, the processor 160 may control the switching unit 140 to supply a power from the battery cell 110 to the auxiliary battery 15. In this case, unlike the embodiments of FIGS. 3 and 4, it may be understood that an operation power is not directly supplied from the battery cell 110 to the vehicle control unit 11 but is indirectly supplied via the auxiliary battery 15.

More specifically, in the configuration of FIG. 5, if the mounting recognition unit 150 transmits a signal indicating that the battery pack 100 is mounted (an arrow c1), the processor 160 may transmit a turn-on signal to the switching unit 140 (an arrow c2). Then, the power supplied from the battery pack 100 may be supplied to the auxiliary battery 15 via the DC/DC converter 16, so that the auxiliary battery 15 is charged.

In addition, due to the charging of the auxiliary battery 15, an operation power may be stably supplied from the auxiliary battery 15 to the vehicle control unit 11. Therefore, when the vehicle 10 is started by the driver, the vehicle control unit 11 may operate normally to communicate stably with the processor 160 of the battery pack 100, and by turning on the motor switch 14 (an arrow c3), the driving power of the battery pack 100 may be supplied to the motor 12.

According to this configuration of the present disclosure, even though the auxiliary battery 15 is fully discharged in the vehicle 10, the auxiliary battery 15 of the vehicle 10 may be charged as soon as the driver mounts the battery pack 100 to the vehicle 10. Therefore, an operation power may be stably supplied to the vehicle control unit 11 by the auxiliary battery 15, so that the vehicle 10 may be started and operated normally.

Figure 6:
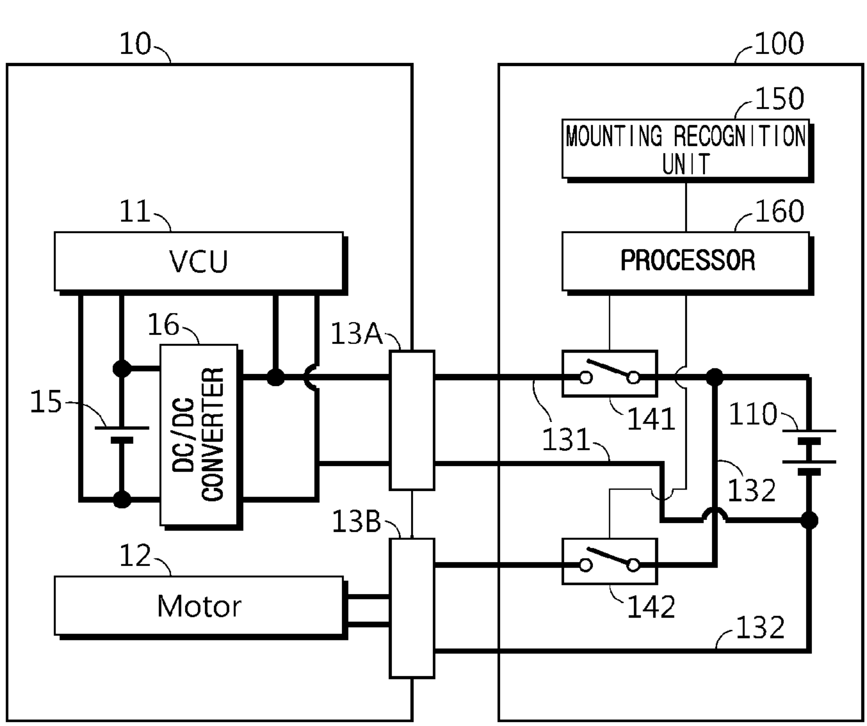
FIG. 6 is a diagram schematically showing a circuitry connection configuration between the battery pack and the vehicle according to still another embodiment of the present disclosure.

FIG. 6 is a diagram schematically showing a circuitry connection configuration between the battery pack 100 and the vehicle 10 according to still another embodiment of the present disclosure. In this embodiment, features different from the former embodiment will also be described in detail.

Referring to FIG. 6, this embodiment is generally similar to the embodiment of FIG. 4, except that an auxiliary battery 15 for supplying a power to the vehicle control unit 11 is provided, similar to the embodiment of FIG. 5. However, unlike the embodiment of FIG. 5, the vehicle 10 may not include a switch like the motor switch 14 on the path between the connection terminal 13B and the motor 12.

In the case of the battery pack 100 configured to be attachable to and detachable from the vehicle 10 having the above configuration, if the mounting recognition unit 150 recognizes that the battery pack 100 is mounted to the vehicle 10, the processor 160 may control the control switching unit 141 so that the auxiliary battery 15 is charged. In addition, due to the charging of the auxiliary battery 15, the vehicle control unit 11 may operate normally. Accordingly, if the driver starts the vehicle, a start request signal may be transmitted to the processor 160 so that the processor 160 turns on the driving switching unit 142. Therefore, a driving power may be supplied to the motor 12 from the battery cell 110, and the motor 12 may be driven according to the control of the driver.

Meanwhile, in the embodiment in which the auxiliary battery 15 is provided as shown in FIG. 6, the processor 160 may receive SOC (State Of Charge) information of the auxiliary battery 15 from the vehicle control unit 11. In addition, the processor 160 may control the control switching unit 141 to turn on/off based on the SOC information of the auxiliary battery 15. For example, in a state where the processor 160 turns on the driving switching unit 142 to supply a driving power to the motor 12, the SOC information of the auxiliary battery 15 may be provided from the vehicle control unit 11. At this time, if the SOC of the auxiliary battery 15 is equal to or greater than a reference value, the processor 160 may convert the control switching unit 141 from a turn-on state to a turn-off state. Meanwhile, if the SOC of the auxiliary battery 15 is less than the reference value, the processor 160 may maintain the turn-on state of the control switching unit 141 as it is.

According to this configuration of the present disclosure, when the auxiliary battery 15 is in a low SOC state, even in a situation where the vehicle 10 is running during which the motor 12 is driven, the auxiliary battery 15 may be continuously charged. Accordingly, it is possible to continuously maintain the normal operating state of the vehicle control unit 11, and it is possible to prevent the auxiliary battery 15 of the vehicle 10 from being easily discharged even after the battery pack 100 is separated.

The mounting recognition unit 150 may be configured to recognize whether the battery pack 100 is mounted in various ways.

In an embodiment, the mounting recognition unit 150 may be configured to be physically deformed when the battery pack 100 is placed at a designated position of the vehicle 10 to recognize whether the battery pack 100 is mounted. This will be described in more detail with reference to FIGS. 7 and 8.

Figure 7:
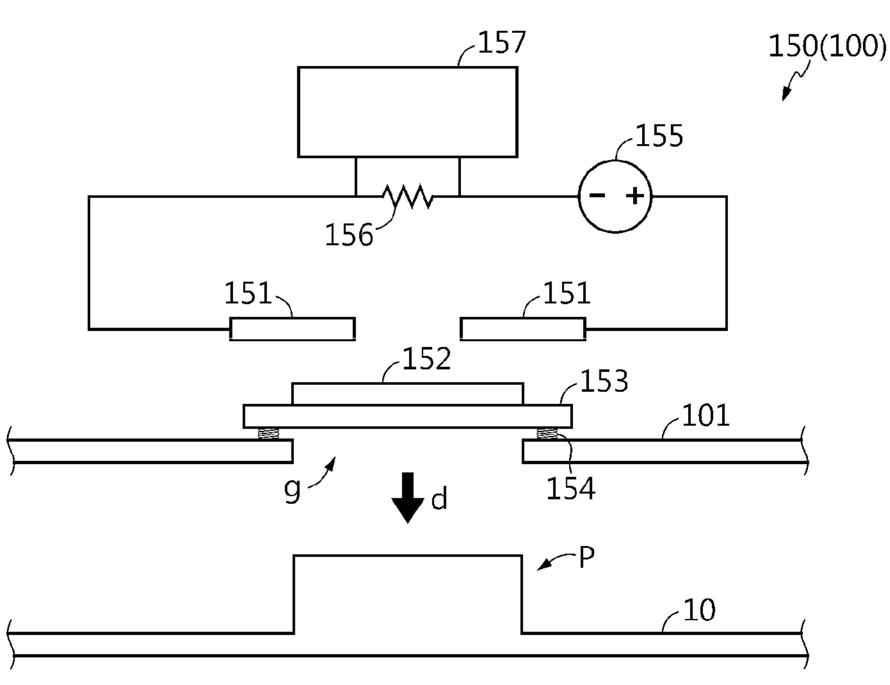
FIG. 7 is a diagram schematically showing a configuration of a mounting recognition unit according to an embodiment of the present disclosure.
Figure 8:
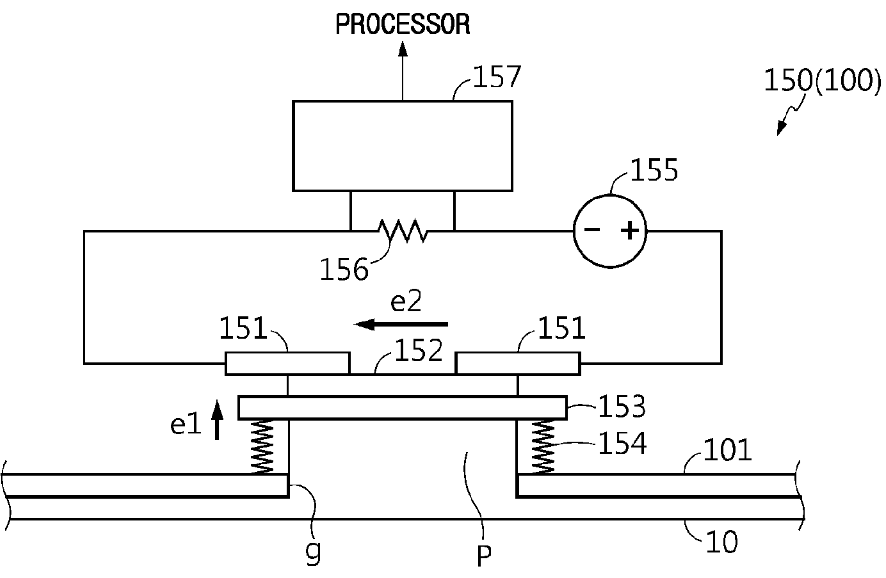
FIG. 8 is a diagram schematically showing a configuration of the mounting recognition unit of FIG. 7, in a state where the battery pack is mounted to the vehicle.

FIG. 7 is a diagram schematically showing a configuration of a mounting recognition unit 150 according to an embodiment of the present disclosure, and FIG. 8 is a diagram schematically showing a configuration of the mounting recognition unit 150 of FIG. 7, in a state where the battery pack 100 is mounted to the vehicle 10.

First, referring to FIG. 7, the mounting recognition unit 150 of the battery pack 100 may include two coupling pieces 151 made of an electrically conductive material and spaced apart from each other by a predetermined distance. In addition, the mounting recognition unit 150 may include a voltage applying unit 155 so that a + (positive) terminal and a − (negative) terminal thereof are respectively connected to the two coupling pieces 151 to apply a predetermined voltage. However, since the two coupling pieces 151 are spaced apart from each other by a predetermined distance, a current may not flow therebetween. In addition, a connection piece 152 may be provided to be spaced apart from the two coupling pieces 151 by a predetermined distance, for example to be spaced apart by a predetermined distance in a lower direction as shown in the drawing. The connection piece 152 may be made of an electrically conductive material. In addition, the connection piece 152 is placed on a moving cover 153, the moving cover 153 may be connected to the pack case 101 through an elastic body 154. Here, the elastic body 154 may be configured in the form of a spring or the like.

In particular, a pack fastening portion may be formed at the pack case 101 of the battery pack 100 as indicated by 'g'. For example, the pack fastening portion g may be formed as a hole perforated in a part of the pack case 101 as shown in the drawing. In addition, in the battery mounting portion of the vehicle 10, as indicated by 'p', a vehicle fastening portion may be formed in a position and shape corresponding to the pack fastening portion g. For example, as shown in the figure, the vehicle fastening portion p may be formed in a protrusion shape to be inserted into the pack fastening portion g formed in the hole shape.

Further, in a state where the battery pack 100 is not mounted to the vehicle, the moving cover 153 may be configured to cover the hole of the pack fastening portion g so that the inside of the battery pack 100 is not exposed to the outside through the pack fastening portion g having a hole shape. Also, the moving cover 153 may be made of an electrically non-conductive material, for example, a plastic material. In addition, if the battery pack 100 is placed on the vehicle 10 as indicated by an arrow d, the moving cover 153 may be configured to be movable, so that the mounted connection piece 152 may connect the two coupling pieces 151 to each other.

More specifically, referring to FIG. 8, if the battery pack 100 is mounted at a correct position on the mounting portion of the vehicle 10, such as a vehicle body, the vehicle fastening portion p may be inserted into the pack fastening portion g. At this time, the vehicle fastening portion p configured in a protrusion shape protruding in an upper direction pushes the moving cover 153 in an upper direction, as indicated by an arrow e1 in the figure, and the elastic body 154 may be stretched. In addition, as the moving cover 153 moves as above, the connection piece 152 placed on the upper portion of the moving cover 153 also moves in the upper direction, so that both ends of the connection piece 152 may contact the two coupling pieces 151. At this time, since a power is applied between the two coupling pieces 151 by the power applying unit 155, as indicated by an arrow e2, a current may flow between the two coupling pieces 151. Here, a sensor resistor 156 may be installed on the current path, and a detection unit 157 may be configured to detect a voltage at both ends of the sensor resistor 156. Accordingly, if a current flows between the two coupling pieces, the detection unit 157 may detect the flow of the current and transmit information indicating that the battery pack 100 is properly mounted to the vehicle 10 to the processor 160.

According to this embodiment of the present disclosure, it is possible to be accurately recognize that the battery pack 100 is properly mounted to the vehicle 10 by the battery pack 100 itself just with a simple configuration. Also, in a state where the battery pack 100 is not mounted to the vehicle 10, the inner space of the battery pack 100 may not be exposed. In addition, according to this embodiment, it is recognized that the battery pack 100 is mounted only when the battery pack 100 is correctly placed at the designated position of the vehicle 10, thereby preventing the problem that the power supply path 130 is connected even when the battery is incorrectly placed.

In another embodiment, the mounting recognition unit 150 may include a position recognition module, such as a GPS module, configured to recognize the position of the battery pack 100. In addition, the mounting recognition unit 150 may be configured to recognize whether the battery pack 100 is mounted by means of the position recognition module. This will be described in more detail with reference to FIG. 9.

Figure 9:
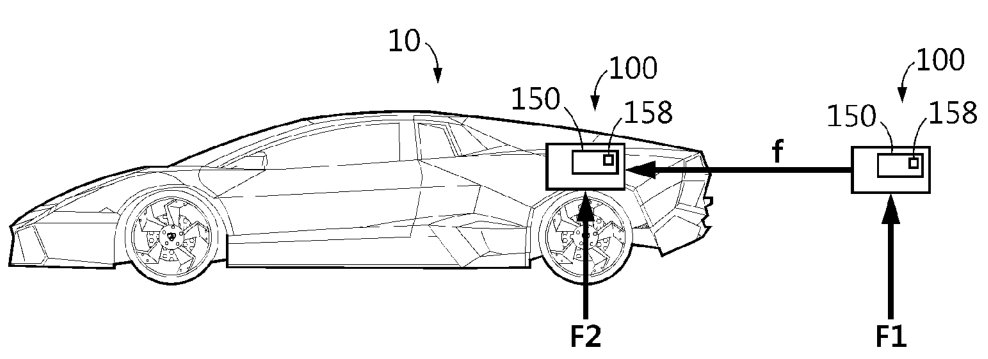
FIG. 9 is a diagram schematically showing a configuration of a mounting recognition unit according to another embodiment of the present disclosure.

FIG. 9 is a diagram schematically showing a configuration of a mounting recognition unit 150 according to another embodiment of the present disclosure.

Referring to FIG. 9, the mounting recognition unit 150 of the battery pack 100 may include a GPS (Global Positioning System) module 158. In addition, the mounting recognition unit 150 may figure out the position of the battery pack 100 through the GPS module 158. In addition, the mounting recognition unit 150 may be configured to recognize whether the battery pack 100 is mounted to the vehicle 10 by using the position of the battery pack 100 figured out using the GPS module 158 as described above.

More specifically, if the battery pack 100 is located at a point F1 in FIG. 9, the mounting recognition unit 150 may recognize that the battery pack 100 is not mounted to the vehicle 10 based on the position identified through the GPS module 158. However, as indicated by an arrow f in FIG. 9, if the battery pack 100 is moved and located at a point F2 in FIG. 9, the mounting recognition unit 150 may recognize that battery pack 100 is mounted to the vehicle 10 by recognizing the position of the point F2 through the GPS module 158.

At this time, information about the position of the vehicle 10 may be provided in advance to the mounting recognition unit 150. In particular, recently, many vehicles are equipped with a GPS module, so that the position of the vehicle may be figured in many cases. Moreover, in the case of a shared vehicle used for e-mobility service, since a GPS module may be almost necessarily mounted, it may be possible to figure out the position of the vehicle through the GPS module of the vehicle. In addition, the vehicle position information figured out in this way may be stored in a separate server through a wireless communication network and then transmitted to the mounting recognition unit 150, or may be transmitted directly to the mounting recognition unit 150 of the battery pack 100.

In this case, the mounting recognition unit 150 may determine whether the battery pack 100 is mounted to the vehicle 10 by comparing the separately provided position information of the vehicle with the location information of the battery pack 100 figured out by itself. Of course, the position information of the vehicle may be stored in advance in a memory of the mounting recognition unit 150 or the like.

According to this configuration of the present disclosure, it is not necessary to provide a mechanical fastening and detecting configuration separately for the vehicle 10 and the battery pack 100 to figure out whether the battery pack 100 is mounted, so that the external shape of the battery pack 100 may be more simplified. In addition, in this embodiment, it may be easily checked whether the battery pack 100 is mounted to the vehicle 10 regardless of the shape or type of the battery pack 100 and the vehicle 10.

In addition, the mounting recognition unit 150 may recognize that the battery pack 100 is mounted to the vehicle 10 in various other ways. For example, the mounting recognition unit 150 may include an acceleration sensor, and may be configured to recognize whether the battery pack is mounted by using an acceleration measurement value by the acceleration sensor.

A vehicle according to the present disclosure may include the battery pack 100 according to the present disclosure described above. In particular, the vehicle according to the present disclosure may be configured so that an exchangeable battery pack 100 is mounted thereto, as described in the various embodiments. In addition, the vehicle according to the present disclosure may further include other devices, such as the vehicle control unit 11, the motor 12, the connection terminal 13 and the motor switch 14 described above, in addition to the battery pack 100. In addition, the vehicle according to the present disclosure may further employ various components of the vehicle known at the time of filing of this application.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGNS

100: battery pack
101: pack case
110: battery cell
120: power supply terminal
121: control power terminal, 122: driving power terminal
130: power supply path
131: control power path, 132: driving power path
140: switching unit
141: control switching unit, 142: driving switching unit
150: mounting recognition unit
151: coupling piece, 152: connection piece, 153: moving cover, 154: elastic body, 155: power applying unit, 156: sensor resistor, 157: detection unit, 158: GPS module
160: processor
10: vehicle
11: vehicle control unit
12: motor
13: connection terminal
14: motor switch
15: auxiliary battery
16: DC/DC converter

What is claimed is:

1. A battery pack, which is configured to be mountable to and detachable from a vehicle driven by a motor and having a vehicle control unit to supply a driving power to the motor, the battery pack comprising:

a battery assembly having at least one secondary battery;

a power supply terminal configured to be connectable to a connection terminal of the vehicle that is connected to the vehicle control unit and the motor;

a power supply path located between the power supply terminal and the battery assembly and configured to supply a power from the battery assembly to the power supply terminal;

a switching unit provided on the power supply path and configured to electrically turn on/off the power supply path;

a mounting recognition unit configured to recognize whether the battery pack is mounted to the vehicle;

a processor configured to control the switching unit so that power is supplied from the battery assembly to the vehicle control unit, when receiving a signal from the mounting recognition unit that the battery pack is recognized as being mounted to the vehicle; and a pack case forming a part of a surface of the battery pack, wherein when the vehicle includes an auxiliary battery for supplying power to the vehicle control unit, and the auxiliary battery of the vehicle is fully discharged, the processor is configured to control the switching unit so that power is supplied from the battery assembly to the auxiliary battery, thereby supplying power to the vehicle control unit, wherein the mounting recognition unit is configured to be physically deformed when the battery pack is placed at a designated position of the vehicle to recognize whether the battery pack is mounted, wherein the mounting recognition unit includes:

coupling pieces including an electrically conductive material and spaced apart from each other by a first distance, a moving cover, a connection piece located on the moving cover and spaced apart from the coupling pieces by a second distance, an elastic body connected to the moving cover, and a voltage applying unit connected to the coupling pieces and configured to apply a predetermined voltage to the coupling pieces so that a current is able to flow between the coupling pieces when the connection piece contacts the coupling pieces, wherein the elastic body is further connected to the pack case and is configured to be stretched in a direction when the battery pack is mounted on a portion of the vehicle, and the portion of the vehicle pushes against the moving cover to close the second distance between the moving cover and the coupling pieces, and wherein the pack case has a hole and the moving cover is configured to cover the hole.

2. The battery pack according to claim 1, wherein the processor is configured to be communicable with the vehicle control unit and transmit a response signal to the vehicle control unit when receiving a start request signal of a user from the vehicle control unit.

3. The battery pack according to claim 1, wherein the power supply terminal includes:

a control power terminal configured to be connectable to a connection terminal of the vehicle control unit; and a driving power terminal configured to be connectable to a connection terminal of the motor, and wherein the power supply path includes:

a control power path connected between the battery assembly and the control power terminal and configured to supply an operation power to the vehicle control unit, and a driving power path connected between the battery assembly and the driving power terminal and configured to supply the driving power to the motor.

4. The battery pack according to claim 3, wherein the switching unit includes:

a control switching unit provided on the control power path and configured to turn on and off supply of the operation power; and a driving switching unit provided on the driving power path and configured to turn on and off supply of the driving power.

5. The battery pack according to claim 4, wherein the processor is configured to turn on the control switching unit so that the operation power is supplied from the battery assembly to the vehicle control unit, when the mounting recognition unit recognizes that the battery pack is mounted.

6. The battery pack according to claim 5, wherein the processor is configured to turn on the driving switching unit so that the driving power is supplied from the battery assembly to the motor, when receiving a start request signal of a user from the vehicle control unit.

7. The battery pack according to claim 1, wherein the mounting recognition unit includes a global positioning system (GPS) module to recognize whether the battery pack is mounted.

8. A vehicle, comprising the battery pack according to claim 1.

9. The battery pack according to claim 1, wherein, when the auxiliary battery is fully discharged, the auxiliary battery is charged while the battery pack is mounted to the vehicle, so that the vehicle is started and operated normally.

10. The battery pack according to claim 1, wherein the mounting recognition unit further includes a sensor resistor in a current path of the coupling pieces and the voltage applying unit.

11. The battery pack according to claim 1, wherein the mounting recognition unit further includes a detection unit configured to transmit information to the processor indicating that the battery pack is properly mounted to the vehicle when the mounting recognition unit detects flow of the current between the coupling pieces.

* * * * *